United States Patent [19]
Terrill

[11] Patent Number: 5,301,453
[45] Date of Patent: Apr. 12, 1994

[54] FISH LURE WITH INTERCHANGEABLE BODY SECTION

[76] Inventor: Maurice W. Terrill, 12454 E. Alsaka Ave., Aurora, Colo. 80012

[21] Appl. No.: 778,270
[22] Filed: Oct. 17, 1991
[51] Int. Cl.$^5$ ............................................. A01K 85/00
[52] U.S. Cl. .................................. 43/42.09; 43/42.24
[58] Field of Search .................. 43/42.09, 42.24, 42.45

[56] References Cited

U.S. PATENT DOCUMENTS

| | | | |
|---|---|---|---|
| 2,573,592 | 10/1951 | Nichel | 43/42.09 |
| 2,996,826 | 8/1961 | Lamar | 43/42.09 |
| 3,289,345 | 12/1966 | Reininger et al. | 43/42.09 |
| 4,700,503 | 10/1987 | Pippert | 43/42.09 |

FOREIGN PATENT DOCUMENTS 0639160  4/1962  Canada ................. 43/42.09

Primary Examiner—Paula A. Bradley
Assistant Examiner—James Miner
Attorney, Agent, or Firm—N. J. Aquilino

[57] ABSTRACT

A fish lure, including a rigid body and interchangeable body sleeves, telescopically attached to the rigid body, whereby a variety of bait configurations can be used on the same lure in accordance with particular fishing conditions.

5 Claims, 2 Drawing Sheets

FISH LURE WITH INTERCHANGEABLE BODY SECTION

BACKGROUND OF THE INVENTION

The invention relates to a fish lure, and in particular, to a fish lure having interchangeable body parts.

A wide variety of fish lures are designed to catch certain fish in particular different circumstances. For example, the type of fish which is to be caught, weather conditions, time of day and other factors determine which particular lure will be most effective to catch the fish at a particular time and location. For this reason, most fishermen have a relatively large collection of lures which are used in various fishing endeavors.

The present invention is directed to a fish lure having an interchangeable body sleeve whereby a single generic lure body may be transformed into a variety of different lure types, thereby eliminating the necessity of having multiple lures. The invention provides a rigid lure body which is connected to a line and uses a flexible body sleeve which is placed over the rigid body. Sleeves are designed in a variety of configurations, sizes and colors, and when used in combination with the generic body, create a different lure configuration with each sleeve. While fishing, a fisherman can easily interchange one body sleeve for another without taking the lure off of the line by simply removing the rear treble hook and sliding off the sleeve that is being used and replacing it with another sleeve. This permits the fisherman to experiment as to what lure design, color, size or other feature catches the most fish without having to undergo the tedious process of attaching and detaching a variety of different lures.

Among the objects of the present invention are the provision of a generic fish lure capable of a variety of different configurations using interchangeable body sleeves, the provision of a lure which eliminates the need for attaching and detaching lures from a line when a lure change is desired and the provision of a lure which eliminates the need for a large number of different lure configurations for various fishing conditions. These and other objects will become apparent from the following description and drawings.

DESCRIPTION OF THE PREFERRED EMBODIMENTS

Figure 1:
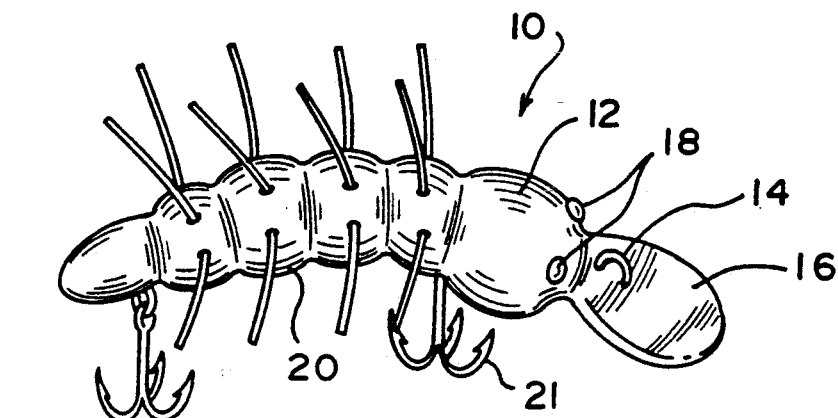
FIG. 1 shows a top perspective view of an assembled fish lure in accordance with the present invention.
Figure 2:
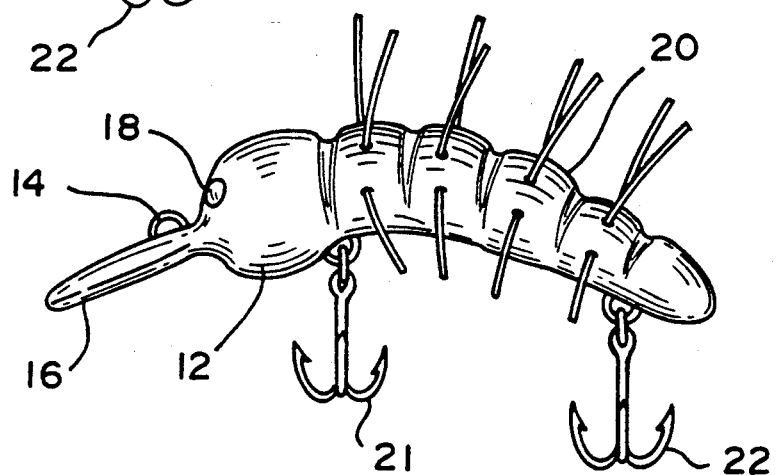
FIG. 2 is a side elevational view thereof.

FIGS. 1 and 2 show views of a lure 10 in accordance with the present invention in an assembled condition. The lure 10 includes a head 12 having a variety of features, such as a bill 16 and eyes 18. The head also includes a hook eye 14 for attaching a fishing line, which eye is preferably attached to the bill 16 A body portion 20 of the lure 10 includes front treble hook 21 and a rear treble hook 22. An interchangeable body sleeve 24 is shown in place over the body 20, as further described hereinbelow.

Figure 3:
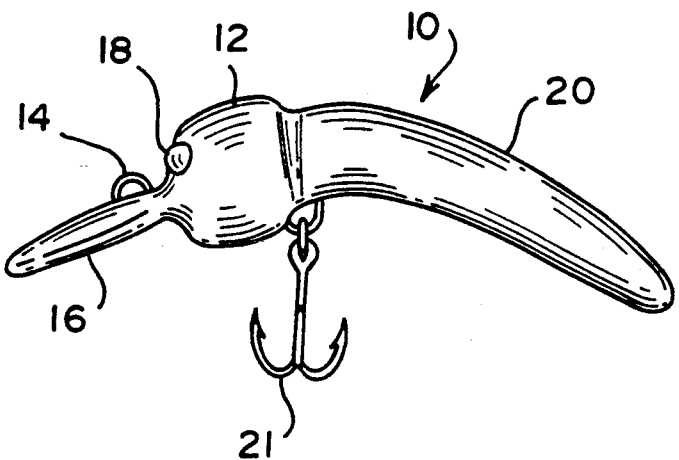
FIG. 3 is an elevational view of a generic form of a lure in accordance with the present invention.

FIG. 3 shows a generic form of the lure 10 without the body sleeve 24 and rear treble hook 22 as shown in FIGS. 1 and 2.

Figure 4:
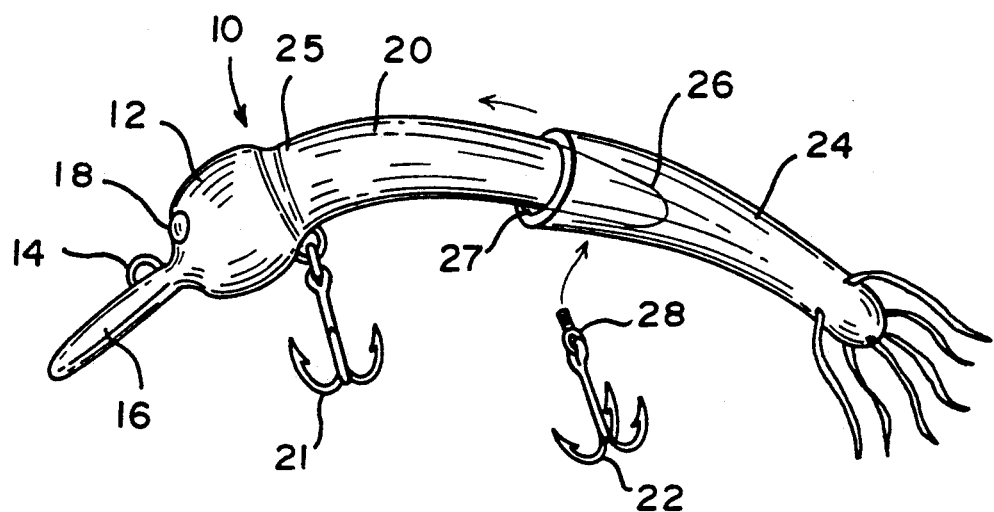
FIG. 4 is a view of the lure disassembled.
Figure 5A:
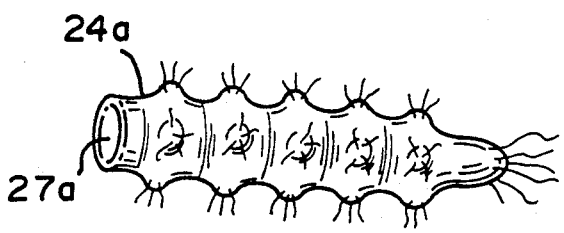
FIGS. 5A through 5E show alternate embodiments of interchangeable body sleeves used with the present invention.
Figure 5D:
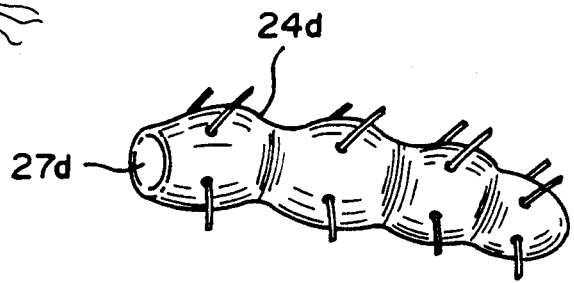
Figure 5B:
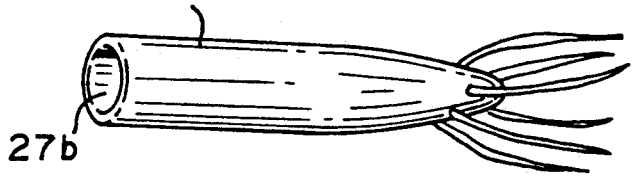
Figure 5C:
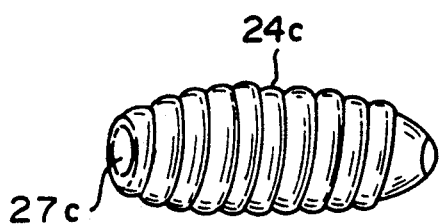
Figure 5E:
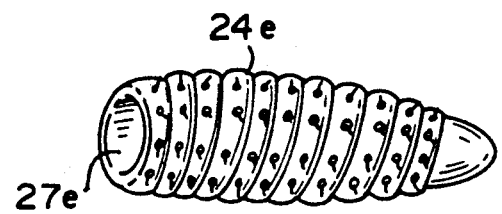

Referring to FIG. 4, the fish lure of the present invention is shown in a disassembled condition. The body 20 is preferably attached to the head 12, and extends rearwardly therefrom. It is contemplated that the body 20 be formed in a curved cylindrical configuration with a forward end 25 and a distal tail end 26. Each body sleeve 24 takes the form of a flexible, tubular sleeve having an outer design to attract fish and an opening 27 on one end thereof. Preferably, the sleeve is made of plastic, fabric or other similar flexible material. Notwithstanding various outer design features, the body sleeve 24 is sized to be attached onto the body 20 by sliding distal tail end 26 of the body 20 into the opening 27 in the sleeve 24 until the forward end of the sleeve abuts the head 12 of the lure 10. Preferably, a light lubricant is used to facilitate the process. The rear treble hook 22 is removable, using a suitable screw 28, or other suitable attaching means to enable the body sleeve 24 to be attached directly on the body 20 without interference. When the sleeve 24 is in place on the lure body 20, the screw 28 is reattached to complete the lure.

FIGS. 5A through 5E disclose a variety of body sleeves, 24A through 24E respectively, showing various outer designs to simulate a variety of bait types.

It will be appreciated that the number of sleeves shown are exemplary only, and that an infinite variety of sleeves of various sizes, colors, shapes and so forth may be used with the present invention to attract fish in keeping within the spirit and scope of the present invention as defined in the following claims.

I claim:

1. A fish lure having interchangeable body parts comprising:
    a head having simulated features of a living creature;
    a rigid body having a forward end attached to the head and tail end;
    an interchangeable, flexible body sleeve, tubular in shape and having at least one opening on one end thereof, said sleeve being telescopically attached onto said rigid body; said opening end of said sleeve positioned adjacent the forward end of said rigid body and juxtaposed the head whereby said sleeve extends the entire length of said rigid body from the forward end to the tail end; and,
    hook members attached to said lure.

2. The fish lure of claim 1 wherein said rigid body is curved between the forward end and the tail end.

3. The fish lure of claim 1 wherein said sleeve further includes distinguishing features on the outer surface thereof, simulating bait.

4. The fish lure of claim 1 wherein at least a rear hook member is removable from the rigid body to facilitate attaching the body sleeve on the rigid body.

5. The fish lure of claim 1 wherein said body sleeve is made of plastic material.

* * * * *